(12) United States Patent
Guo (10) Patent No.: US 8,817,650 B2
(45) Date of Patent: Aug. 26, 2014

(54) METHOD AND APPARATUS FOR CONTROLLING INTELLIGENT ANTENNA SYSTEM

(75) Inventor: Qiang Guo, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 102 days.

(21) Appl. No.: 13/812,456

(22) PCT Filed: Jul. 27, 2011

(86) PCT No.: PCT/CN2011/077674
§ 371 (c)(1),
(2), (4) Date: Jan. 25, 2013

(87) PCT Pub. No.: WO2012/013146
PCT Pub. Date: Feb. 2, 2012

(65) Prior Publication Data
US 2013/0128762 A1  May 23, 2013

(30) Foreign Application Priority Data

Jul. 27, 2010  (CN) .......................... 2010 1 0239309

(51) Int. Cl.
*G01R 31/08* (2006.01)
*H04B 7/06* (2006.01)
*H04W 52/24* (2009.01)

(52) U.S. Cl.
CPC ........... *H04W 52/241* (2013.01); *H04B 7/0602* (2013.01); *Y02B 60/50* (2013.01)
USPC ........... 370/252; 370/254; 370/328; 370/338; 370/401

(58) Field of Classification Search
None
See application file for complete search history.

(56) References Cited

U.S. PATENT DOCUMENTS

| | | | |
|---|---|---|---|
| 7,801,490 | B1 * | 9/2010 | Scherzer .................... 455/67.13 |
| 2002/0128046 | A1 * | 9/2002 | Fukuhara et al. ............. 455/562 |
| 2004/0132496 | A1 | 7/2004 | Kim et al. |
| 2008/0175189 | A1 * | 7/2008 | Furrer et al. .................. 370/328 |
| 2010/0034134 | A1 * | 2/2010 | Larsen .......................... 370/315 |

FOREIGN PATENT DOCUMENTS

| | | |
|---|---|---|
| CN | 1488203 | 4/2004 |
| CN | 101018082 | 8/2007 |
| CN | 101040458 | 9/2007 |

OTHER PUBLICATIONS

International Search Report dated Nov. 3, 2011, PCT Patent Application No. PCT/CN2011/077674 filed Jul. 27, 2011, The State Intellectual Property Office, the P.R. China.
CN First Office Action dated Jul. 2, 2013 issued on CN Patent Application No. 201010239309.8 dated Jul. 27, 2010, The State Intellectual Property Office, the P.R. China.

* cited by examiner

*Primary Examiner* — Duc C Ho (57) ABSTRACT

A method and an apparatus for controlling an intelligent antenna system are provided. The method includes: pre-configuring a Request Min Rate (RR), a Request Max PER (RP) and a request TX power (RTP); A). determining a current antenna configuration and a current transmitting power of the intelligent antenna system; B). reducing the transmitting power as long as the packet loss ratio does not exceed the RP with the current antenna configuration and with RR as a current transmitting rate, and adopting a reduced transmitting power as the current transmitting power; and C). switching between different antenna configurations at intervals with the current transmitting rate and the current transmitting power to obtain an antenna configuration under which the packet loss ratio is lower than the current packet loss ratio, and performing B).

15 Claims, 5 Drawing Sheets

METHOD AND APPARATUS FOR CONTROLLING INTELLIGENT ANTENNA SYSTEM

BACKGROUND

With the development of wireless communications technology, various types of wireless networks appear in people's lives, such as analog communications, 2G, 2.5G, 3G network communications, microwave communications, satellite communications, WiFi communications, WiMAX communications, ultra-red signal communications, Bluetooth® and so on. We are surrounded by various wireless signals. As is well-known, however, radiation from wireless signals is harmful to humans. If the signal strength is reduced within a limited range, the signals will do no harm to human bodies. Thus, it is important to provide control for transmitting power of signal generators. For a wireless network, devices of the same type share the same frequency band, so reducing transmitting power can reduce the interference between base stations and can also improve channel utilization ratio. In addition, control of transmitting power also has connections with energy-saving and reducing carbon emissions, which are currently hot topics. If all signal transmitters reduce their power by 1 dB, a large amount of energy will be saved worldwide.

For reasons such as improving signal quality and increasing network capacity, an intelligent antenna is introduced into a Wireless Local Area Network (WLAN). For hardware, an intelligent antenna system generally employs multiple antennas (or referred to as antenna elements) for transmitting or receiving signals; for software, the system employs an algorithm for selecting some of the antennas to be used in a transmission or for adding extra delay or performing phase shift for signals transmitted by some antennas. Different algorithms adopted for an intelligent antenna may result in differences in values of some link parameters.

DETAILED DESCRIPTION

Figure 1:
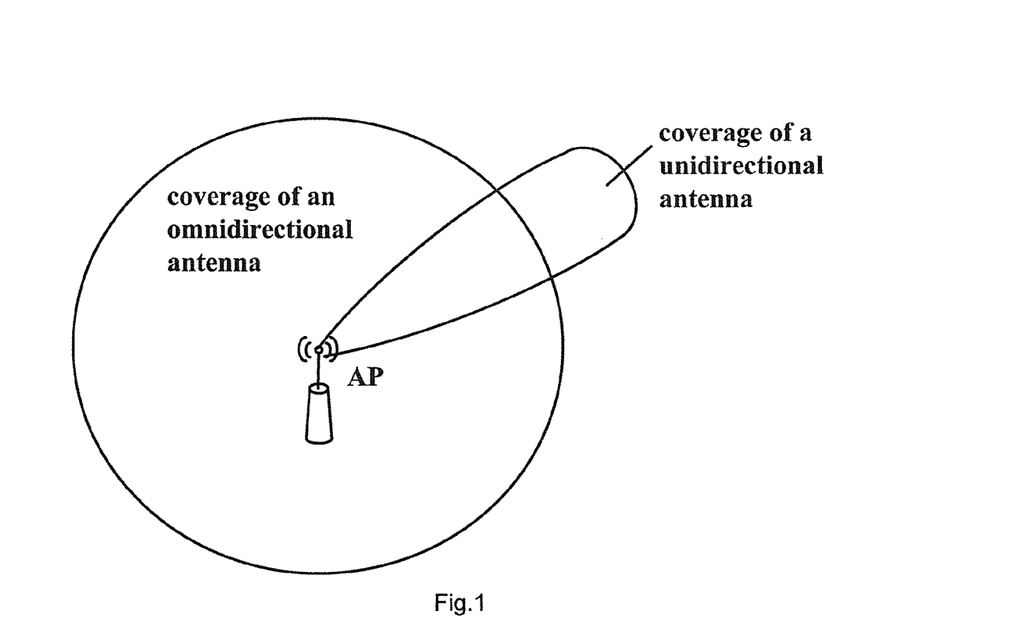
FIG. 1 is a schematic illustrating coverage ability of an intelligent antenna.

A detailed description of examples is hereinafter given with reference to specific implementations and the accompanying drawings. As shown in FIG. 1, beam forming refers to a process of the intelligent antenna in gathering its beam in a certain direction. Beam forming causes transmission power to be directed in the same direction, and the coverage in this direction will become larger while coverage in other directions will become smaller. Thus, an intelligent antenna system can partly reduce radiation strength in some area within the coverage of the intelligent antenna system.

Figure 2:
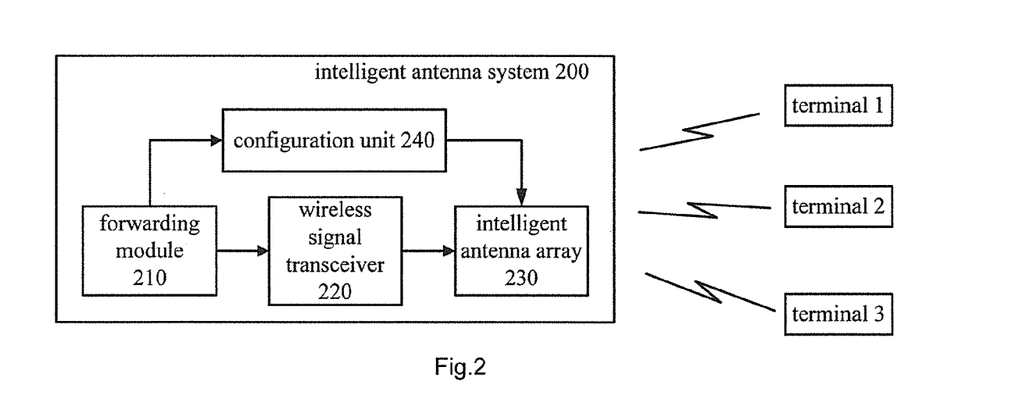
FIG. 2 is a schematic diagram illustrating a structure of an intelligent antenna system according to an example.

As shown in FIG. 2, in an intelligent antenna system 200, all of the data packets are forwarded by a forwarding module 210 to the same signal transceiver 220 and transmitted by an intelligent antenna 230 connected with the signal transceiver 220. A configuration unit 240 selects an optimal antenna configuration for a terminal according to an algorithm. Different antenna configurations may differ in the antennas employed, or in the phase or delay of transmission, and may have different gain diagrams.

In the direction of the beam, signal strength increases significantly, however, the increase in signal strength is unnecessary for terminals within ordinary coverage. However, many current intelligent antenna systems are unable to control transmitting power and thus consume relatively large amounts of energy and generate relatively large amounts of radiation.

Figure 3:
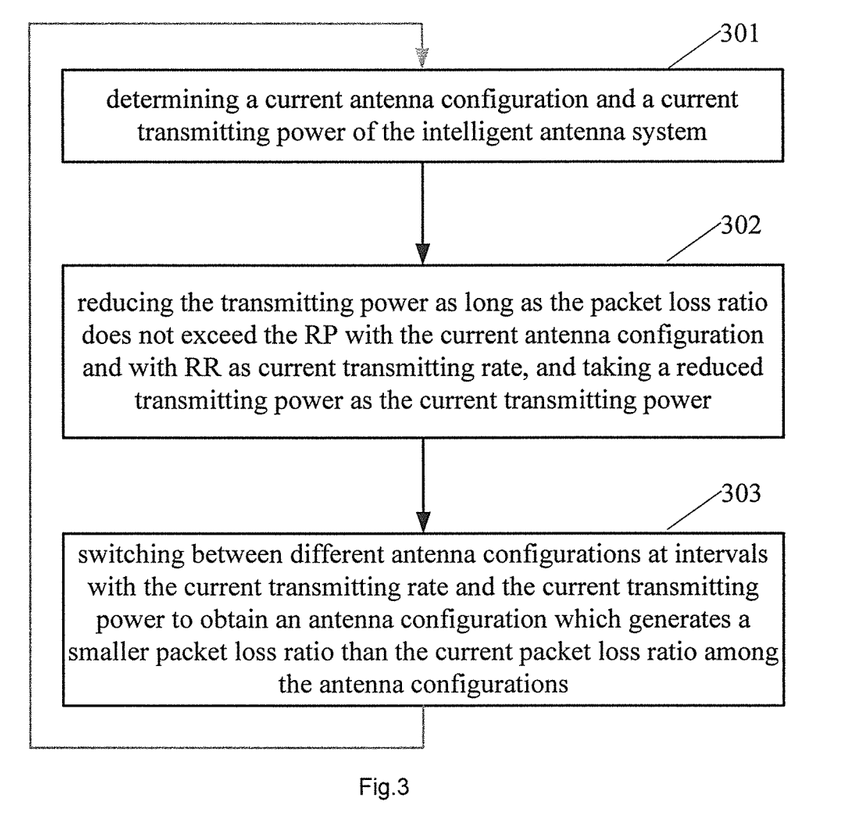
FIG. 3 is a flowchart illustrating a general method provided by an example.

Further methods and specific implementations will now be described. According to a method provided by an embodiment, a request min rate (RR), a request max PER (RP) and a request TX power (RTP) are configured in advance. The RTP refers to the minimal transmitting power which may make the performances of the system meet some requirements, such as coverage requirements, packet loss requirements and so on. The RTP is the lower limit of the transmitting power of the system, and in practice, the transmitting power may not be lower than the RTP. Likewise, the RR is the lower limit of the transmitting rate specified in the system, and the transmitting rate in practice may not be lower than the RR. As shown in FIG. 3, a flow diagram of a method according to an example may include the following steps.

Block 301 includes: determining a current antenna configuration and a current transmitting power of the intelligent antenna system.

Block 302 includes: gradually reducing the transmitting power as long as the packet loss ratio does not exceed the RP with the current antenna configuration and with RR as the current transmitting rate, and taking a reduced transmitting power as the current transmitting power.

Block 303 includes: switching between different antenna configurations at intervals with the current transmitting rate and the current transmitting power to obtain an antenna configuration which generates a smaller packet loss ratio than the current packet loss ratio among the antenna configurations, and performing block 302.

Block 301 may include adopting any of a plurality of different manners for determining the current antenna configuration and transmitting power of the intelligent antenna system, such as adopting the maximum nominal transmitting power of the intelligent antenna system as the initial transmitting power or adopting the RTP as the initial transmitting power. The method will be described in detail with reference to a few examples.

Figure 4:
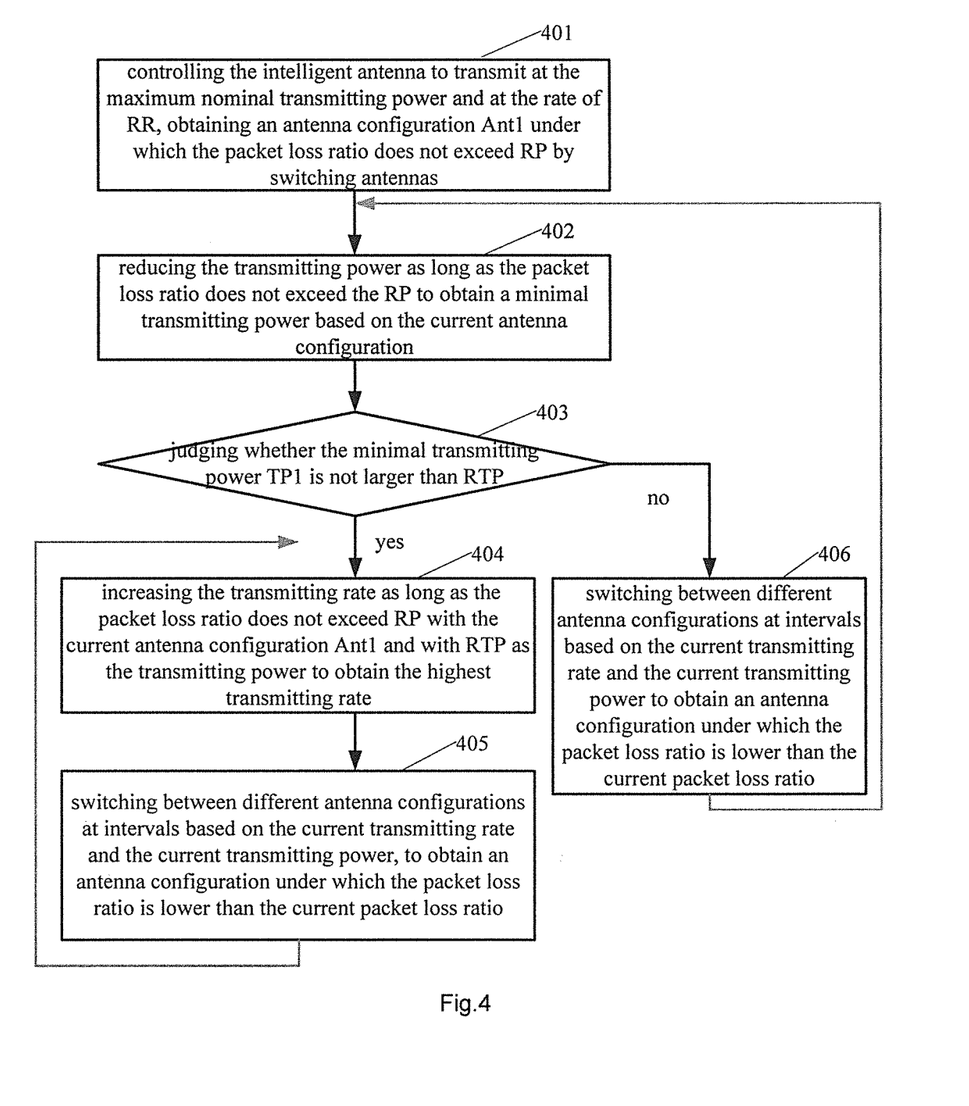
FIG. 4 is a flowchart illustrating a method provided by an example.

An example takes the maximum nominal transmitting power as the initial transmitting power to start the control process of the intelligent antenna. FIG. 4 is a flowchart illustrating a method according to an example. In this example, RR, RP, and RTP are configured in advance. As shown in FIG. 4, the method may include the following operations.

Block 401 includes: controlling the intelligent antenna to transmit at the maximum nominal transmitting power and at the rate of RR, obtaining an antenna configuration Ant1 under which the packet loss ratio does not exceed RP by switching antennas.

In this block, switching antennas (that is, the intelligent antenna array 240 in FIG. 2) in the intelligent antenna system may adopt different manners. For example, when the intelligent antenna array adopts a fixed phase and delay, one or multiple ones of the intelligent antennas may be selected to make the packet loss ratio reach RP, then the selected antennas and the phases and delays of the antennas constitute the antenna configuration Ant1. As another example, the phase and delay of each antenna in the intelligent antenna array is adjusted to make the packet loss ratio reach RP, then the selected antennas and the phases and delays of each of the antennas constitute the antenna configuration Ant1. As yet another example, the above two manners are combined, that is, selecting one or multiple ones of the intelligent antennas in the intelligent antenna array, and the phase and delay of each selected antenna to constitute the antenna configuration Ant1. It should be understood that the methods disclosed herein are not limited to the above two manners for switching antennas, and may adopt other switching manners.

Block 402 includes: reducing the transmitting power as long as the packet loss ratio does not exceed the RP to obtain a minimal transmitting power based on the current antenna configuration.

The current antenna configuration is Ant1, and the minimal transmitting power obtained by reducing the transmitting power as much as possible while keeping the maximum packet loss ratio below or equal to RP may be denoted by TP1.

Block 403 includes: judging whether the minimal transmitting power TP1 is less than or equal to RTP, performing block 404 when TP1 is less than or equal to RTP, or performing block 406 when TP1 is larger than RTP.

Block 404 includes: increasing the transmitting rate as long as the packet loss ratio does not exceed RP with the current antenna configuration Ant1 and with RTP as the transmitting power to obtain the highest transmitting rate.

Since the lower limit of transmitting power RTP has been configured in advance, when the transmitting power TP1 obtained in block 402 is smaller than RTP, RIP is adopted as the transmitting power. This block increases the transmitting rate as much as possible while keeping the packet loss ratio below or equal to RP and keeping the transmitting power below or equal to the minimal transmitting power (the larger of TP1 and RTP), and the highest transmitting rate obtained is denoted by R1.

When this block is completed, a transmitting configuration set (transmitting rate, antenna configuration, transmitting power) obtained is (R1, Ant1, RTP). If TP1 is not smaller than RTP, the transmitting configuration set obtained is (RR, Ant1, TP1).

Block 405 includes: switching between different antenna configurations at intervals based on the current transmitting rate and the current transmitting power, to obtain an antenna configuration under which the packet loss ratio is lower than the current packet loss ratio, and performing block 404.

Switching between different antenna configurations refers to: changing one or multiple ones of the intelligent antennas selected and/or changing the phase and delay of each of the selected antennas. When the selected one or multiple ones of the intelligent antennas are changed, a control circuit may be adopted to control the state of a switch between the wireless signal transceiver and each intelligent antenna to make a selected intelligent antenna connect with the wireless signal transceiver and to make an un-selected intelligent antenna disconnect from the wireless signal transceiver. In implementation, multiple methods may be adopted. For example, a data signal may be adopted to indicate the intelligent antennas selected, e.g., each bit in the data signal indicates whether an intelligent antenna is selected; then the data signal is provided for a decoding circuit, e.g., a Complex Programmable Logic Device (CPLD); the decoding circuit decodes the data signal and obtains the current antenna configuration, controls the switches to connect each selected intelligent antenna with the wireless signal transceiver and to disconnect the un-selected intelligent antennas from the wireless signal transceiver. When the phase and delay of selected intelligent antennas are changed, a data signal indicating the determined phase and delay is provided for the intelligent antenna array, and a functional module of the intelligent antenna array adjusts the phase and delay of the selected intelligent antennas according to the data signal. The functional module is generally inherent in the intelligent antenna array, and the form of the data signal is decided by the intelligent antenna array used, thus will not be described further herein.

The switching between different antenna configurations at intervals may be performed at fixed intervals. Alternatively, each time when the wireless signal transceiver needs to transmit wireless signals, the wireless signal transceiver may inform the configuration unit to switch the antenna configurations.

With the current transmitting rate of R1 and the current transmitting power being RTP, other antenna configurations are adopted at intervals to obtain an antenna configuration under which the packet loss ratio is relatively small, and the antenna configuration is denoted by Ant2.

After the antenna configuration of Ant2 corresponding to a smaller packet loss ratio is obtained, since the current transmitting power is the RTP, block 404 may be performed again to try to increase the transmitting rate as much as possible while keeping the packet loss ratio under the RP. Block 402 may not be performed until the transmitting rate reaches the maximum transmitting rate to reduce the transmitting power as much as possible as long as the packet loss ratio does not exceed the RP.

Block 406 includes: switching between different antenna configurations at intervals based on the current transmitting rate and the current transmitting power to obtain an antenna configuration under which the packet loss ratio is lower than the current packet loss ratio, and performing block 402.

With the current transmitting rate being RR and the current transmitting power being TP1, other antenna configurations are adopted at intervals to obtain an antenna configuration which has a smaller packet loss ratio, and the antenna configuration is denoted by Ant3.

After the antenna configuration of Ant3 corresponding to the smaller packet loss ratio is obtained, since the current transmitting rate is RR, block 402 may be performed again to try to reduce the transmitting power as much as possible while keeping the packet loss ratio within RP.

Through the above control process, adopting an ideal antenna configuration in theory may result in the transmitting rate approaching the maximum transmitting rate, the transmitting power being as low as possible and the packet loss ratio approaching zero. The above repeated blocks in the control process may be performed continuously. Alternatively, the repeated blocks may be performed for a number of times to select an optimal configuration set among all configuration sets adopted according to a pre-set rule, and may be started again after the selected configuration set is used for a period of time. In the latter situation, the control process may be started after a pre-set time interval, or may be determined according to performances of the system in operation, such as when the packet loss ratio reaches an upper limit, and so on.

Figure 5:
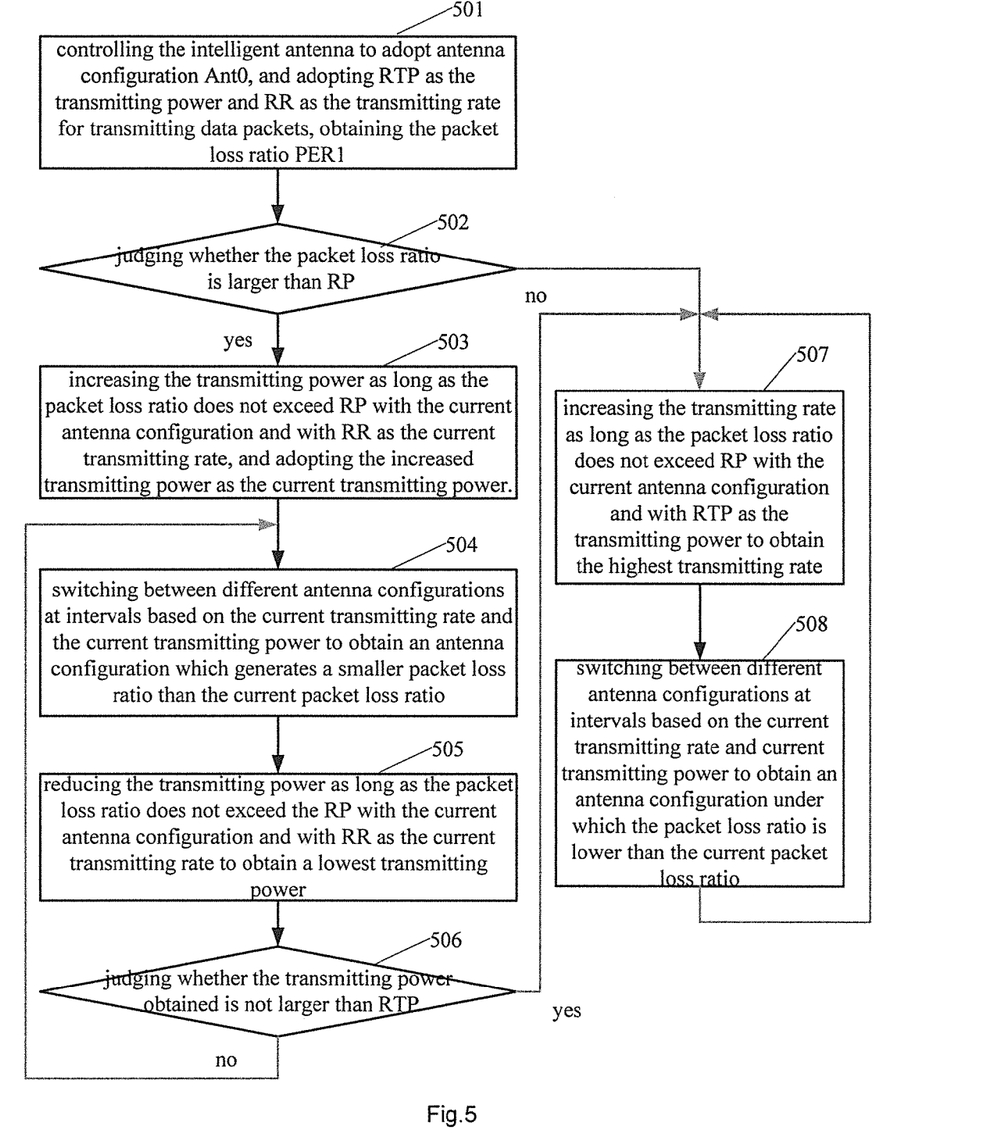
FIG. 5 is a flowchart illustrating a method provided by an example.

The following example takes the minimal transmitting power as the initial transmitting power to start the control process of the intelligent antenna. FIG. 5 is a flowchart illustrating a method according to this example. In this example, RR, RP, and RTP are configured in advance. As shown in FIG. 5, the method may include the following operations.

Block 501 includes: controlling the intelligent antenna to adopt antenna configuration Ant0, and adopting RTP as the transmitting power and RR as the transmitting rate for transmitting data packets, obtaining the packet loss ratio PER1.

In this block, the antenna configuration Ant0 may be any configuration selected randomly, or may be a pre-set or default configuration.

Block 502 includes: judging whether the packet loss ratio is larger than RP, and performing block 503 if the packet loss ratio is larger than RP, or performing block 507 if the packet loss ratio is not larger than RP.

The current packet loss ratio is PER1, since it is required that the packet loss should not exceed RP, block 503 is performed to increase the transmitting power to keep the packet loss ratio below or equal to RP when the current packet loss ratio exceeds RP.

If the packet loss ratio does not exceed the requirement of RP, that is, not exceeding RP, since the transmitting power has reached RTP, the transmitting rate is increased as much as possible while keeping the packet loss ratio below or equal to RP.

Block 503 includes: gradually increasing the transmitting power as long as the packet loss ratio does not exceed RP with the current antenna configuration and with RR as the current transmitting rate, and adopting the increased transmitting power as the current transmitting power.

When the current antenna is Ant0, the transmitting power obtained by increasing the transmitting power in this step until the RP requirement is stratified is denoted by TP1.

Block 504 includes: switching between different antenna configurations at intervals based on the current transmitting rate and the current transmitting power to obtain an antenna configuration which generates a smaller packet loss ratio than the current packet loss ratio.

After block 503 is performed, a transmitting configuration set (transmitting rate, antenna configuration, transmitting power) obtained is (R1, Ant1, RTP). Supposing the antenna configuration obtained after block 504 is Ant2, the transmitting configuration set is (RR, Ant2, TP1).

Block 505 includes: reducing the transmitting power as long as the packet loss ratio does not exceed the RP with the current antenna configuration and with RR as the current transmitting rate to obtain a lowest transmitting power.

After block 504 is performed, the transmitting rate has reached the highest transmitting rate, thus the transmitting power is reduced as much as possible under the configuration of Ant2, and the lowest transmitting power which makes the packet loss ratio fall below or equal to the RP is denoted by TP2.

Block 506 includes: judging whether the transmitting power obtained is not larger than RTP, and performing block 507 when the transmitting power is not larger than RTP, or performing block 504 when the transmitting power is larger than RTP.

Since the transmitting power is required to be larger than or equal to RTP, RTP is directly adopted as the transmitting power when the transmitting power is smaller than or equal to RTP, from which the transmitting rate is increased as long as the RP requirement is satisfied.

Block 507 includes: increasing the transmitting rate as long as the packet loss ratio does not exceed RP with the current antenna configuration and with RTP as the transmitting power to obtain the highest transmitting rate.

If the packet loss ratio is smaller than or equal to RP, since the transmitting power has already been RTP, this block increases transmitting rate as much as possible as long as the packet loss ratio does not exceed RP. If the R1 reaches the maximum transmitting rate supported by the system, another attempt at reducing the transmitting power is taken, i.e., performing block 505; otherwise, block 508 is performed.

After this block, the transmitting configuration set obtained is (R1, Ant0, RTP).

Block 508 includes: switching between different antenna configurations at intervals based on the current transmitting rate and current transmitting power to obtain an antenna configuration under which the packet loss ratio is lower than the current packet loss ratio, and performing block 507.

Since the current transmitting power has reached the minimal transmitting power, the antenna configuration is switched to find an antenna configuration under which the packet loss ratio is smaller.

Likewise, through the above control process, adopting an ideal antenna configuration in theory may result in the transmitting rate approaching the maximum transmitting rate, the transmitting power being as low as possible and the packet loss ratio approaching zero. The above repeated steps in the control process may be performed continuously. Alternatively, the repeated steps may be performed for a number of times to select an optimal configuration set among all of the attempted configuration sets according to a pre-set rule, and may be started again after using the selected configuration set for a period of time.

Figure 6:
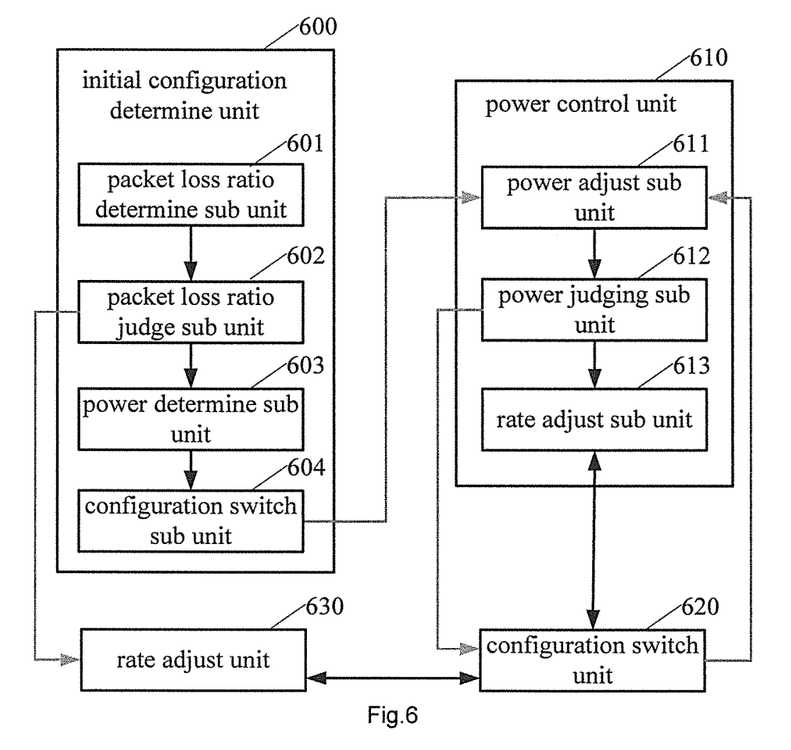
FIG. 6 is a schematic illustrating a structure of an apparatus provided by an example.

The above describes the method provided by some examples, and an apparatus according to an example will now be described below in detail. In the apparatus, the lower limit of the transmitting rate is pre-defined to be RR, the upper limit of the packet loss ratio is pre-defined to be RP, and the lower limit of the transmitting power is pre-defined to be RTP. As shown in FIG. 6, the apparatus may include: an initial configuration determining unit 600, a power control unit 610 and a configuration switch unit 620. It should be noted that only the components related with implementation of this technical scheme are shown in the drawing to be precise and clear, and some existing components are omitted, such as a processor, a physical storage, communication interfaces and so on. In addition, the modules in the figure are classified according to their functions. But such apparatus used in practice may have a different physical structure, or may be constructed according to the structure shown in the figure. For example, some units may be implemented by the same module, functions of a unit may be implemented by multiple different modules, and so on. The units and sub units may be implemented within the same physical device, or may be implemented by several different physical devices. Connections between the sub units may be physical connections or logical connections; may be wired connections or wireless connections.

The initial configuration determine unit 600 is to determine a current antenna configuration and a current transmitting power of an intelligent antenna system, and to send an adjust notification to the power control unit 610.

The power control unit 610 is to gradually reduce transmitting power as long as packet loss ratio does not exceed RP with the current antenna configuration and with RR as a current transmitting rate to obtain a transmitting power which is not smaller than RTP after receiving the adjust notification, to take the transmitting power obtained as the current transmitting power, and to send a switch notification to the configuration switch unit 620.

The configuration switch unit 620 is to switch between antenna configurations at intervals based on the current transmitting rate and the current transmitting power to obtain an antenna configuration under which the packet loss ratio is smaller than the current packet loss ratio after receiving the switch notification from the power control unit 610, and to send an adjust notification to the power control unit 610.

The power control unit 610 may include: a power adjust sub unit 611, a power judging sub unit 612 and a rate adjust sub unit 613.

The power adjust sub unit 611 is to reduce the transmitting power with the current antenna configuration and with RR as the current transmitting rate after receiving the adjust notification, to obtain the smallest transmitting power which keeps the packet loss ratio not exceeding RP.

The power judge sub unit 612 is to judge whether the minimal transmitting power obtained by the power adjust sub unit is not larger than RTP, and to send an adjust notification to the rate adjust sub unit 613 if the minimal transmitting power is not larger than RTP; otherwise, to adopt the minimal transmitting power as the current transmitting power, and to send the switch notification to the configuration switch unit 620.

The rate adjust sub unit 613 is to increase the transmitting rate while adopting RTP as the transmitting power as long as the packet loss ratio does not exceed RP, to adopt the highest transmitting rate obtained as the current transmitting rate, and to send the switch notification to the configuration switch unit 620.

The configuration switch unit 620 is to send the adjust notification to the rate configuration sub unit 613 after receiving the switch notification from the rate adjust sub unit 613 and obtaining the antenna configuration which has the smallest packet loss ratio among the antenna configurations; to send the adjust notification to the power adjust sub unit 611 after receiving the switch notification from the power judge sub unit 612 and obtaining the antenna configuration which has the smallest packet loss ratio among the antenna configurations.

The configuration switch unit 620 may include a control circuit which is to control the connection state of a switch between the wireless signal transceiver and each intelligent antenna to make each selected intelligent antenna connect with the wireless signal transceiver and make each un-selected intelligent antenna disconnect from the wireless signal transceiver, thus the selected one or multiple ones of the intelligent antennas in the intelligent antenna array are changed. For example, the configuration switch unit 620 may include an antenna configuration determine module and a decoding circuit. The antenna configuration determine module is to generate a data signal for indicating the selected one or multiple ones of the intelligent antennas, e.g., each bit of the data signal may indicate whether an intelligent antenna is selected. The decoding circuit, e.g., a CPLD, is to decode the data signal and obtain the currently-determined antenna configuration, to control switches between the intelligent antennas and the wireless signal transceiver to connect each selected intelligent antenna with the wireless signal transceiver and to disconnect each un-selected intelligent antenna from the wireless signal transceiver.

The configuration switch unit 620 may provide a data signal for indicating the determined phase and delay for the intelligent antenna array, and a functional module in the intelligent antenna array may adjust the phase and delay of the selected intelligent antennas according to the data signal, thus the phase and delay of the selected intelligent antennas are changed.

The configuration switch unit 620 may receive an instruction from the wireless signal transceiver which is sent when the wireless signal transceiver needs to transmit wireless signals, and switch the antenna configurations in response to the instruction; or may perform the antenna configuration switching at pre-defined fixed intervals.

When the intelligent antenna system adopts the maximum transmitting power as the initial transmitting power, the initial configuration determine unit 600 may control the intelligent antenna system to adopt the pre-set upper limit of the transmitting power and adopt RR as the transmitting rate for transmitting data packets, and adopt an antenna configuration whose packet loss ratio does not exceed RP obtained through antenna switching as the current antenna configuration.

When the intelligent antenna system adopts the lower limit of transmitting power as the initial transmitting power, the initial configuration determine unit 600 may include: a packet loss ratio determine sub unit 601, a packet loss ratio judge sub unit 602, a power determine sub unit 603 and a configuration switch sub unit 604.

The packet loss ratio determine sub unit 601 is configured to control the intelligent antenna system to adopt one of antenna configurations and transmit data packets using RTP as the transmitting power and RR as the transmitting rate, and obtain the current packet loss ratio.

The one of the antenna configurations may be any antenna configuration, or be a pre-set or default initial antenna configuration.

The packet loss ratio judge sub unit 602 is to judge whether the current packet loss ratio exceeds RP.

The power determining sub unit 603 is to adopt the current antenna configuration when the packet loss ratio judge sub unit 602 determines that the current packet loss ratio exceeds RP, to adopt RR as the current transmitting rate, to increase the transmitting power as long as the packet loss ratio does not exceed RP, and to take the highest transmitting power as the current transmitting power. Since the current packet loss ratio exceeds RP, the highest transmitting power refers to the minimal transmitting power which makes the packet loss ratio not exceed RP after the transmitting power is increased, not the highest nominal transmitting power of the system.

The configuration switch sub unit 604 is to switch between antenna configurations based on the current transmitting rate and the current transmitting power after the power determine sub unit 603 has increased the transmitting power, to take an antenna configuration among the antenna configurations which makes the packet loss ratio smaller than the current packet loss ratio as the current antenna configuration, and to send an adjust notification to the power control unit 610.

Accordingly, the apparatus may further include a rate adjust unit 630.

The rate adjust unit 630 is to increase the transmitting rate with RTP as the transmitting power as long as the packet loss ratio does not exceed RP when the packet loss ratio judge sub unit 602 determines the current packet loss ratio does not exceed RP or after receiving the adjust notification from the configuration switch unit 620, to take the highest transmitting rate obtained as the current transmitting rate, and to send a switch notification to the configuration switch unit 620.

The configuration switch unit 620 is further to switch between antenna configurations at intervals based on the current transmitting rate and the current transmitting power to obtain an antenna configuration under which the packet loss ratio is smaller than the current packet loss ratio after receiving the switch notification from the rate adjust unit 630, and to send an adjust notification to the rate adjust unit 630.

The rate adjust unit 630 and the rate adjust sub unit 613 may be implemented by one unit.

The apparatus shown in FIG. 6 may be implemented in the configuration unit 240 in the intelligent antenna system shown in FIG. 2 so that the configuration unit 240 may control not only the intelligent antenna array 230 but also the wireless signal transceiver 220, that is, may control the transmitting power of the intelligent antenna according to practical situations so as to reduce the transmitting power as much as possible while satisfying practical needs, as shown in FIG. 2.

It should be noted that the above method may be performed for each individual terminal. Since different terminals generally have different requirements for packet loss ratio, the method may adopt different antenna configurations and different transmitting power for different terminals.

From the above description it may be seen that, certain of the example method and apparatus disclosed herein may have one or more of the following merits.

1) Smaller transmitting power may be adopted while practical requirements are met through switching of antenna configurations and control of the transmitting power as long as requirements for the packet loss ratio are satisfied, thus, energy consumed for transmitting signals by the intelligent antenna system is reduced, and radiation is also reduced.

2) Channel utilization ratio is increased. Reduction in transmitting power results in decreased coverage of APs which increases the chance of parallel transmission in the same channel, thus the performances of the whole network are improved.

3) Different terminals may be configured with different transmitting power, which adds flexibility in satisfying different needs of different terminals.

4) In conventional systems, intelligent antenna systems adopt the nominal transmitting power for signal transmission. However, some services provided by terminals require lower packet loss ratio, and conventional systems may be incapable of satisfying those service requirements in practice. This deficiency may be cured by adopting the control scheme provided by certain of the example methods and systems disclosed herein.

The example methods and systems disclosed herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a control method as disclosed herein. Specifically, a system or apparatus having a storage medium which stores machine-readable program codes for implementing functions of any of the above examples and which may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize the technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize the technical scheme of any of the above examples.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

What is claimed is:

1. A method for controlling an intelligent antenna system, comprising:
pre-configuring a Request Min Rate (RR), a Request Max PER (RP) and a request TX power (RTP);
A). determining a current antenna configuration and a current transmitting power of the intelligent antenna system;
B). reducing the transmitting power as long as the packet loss ratio does not exceed the RP with the current antenna configuration and with RR as a current transmitting rate, and adopting a reduced transmitting power as the current transmitting power; and
C). switching between different antenna configurations at intervals with the current transmitting rate and the current transmitting power to obtain an antenna configuration under which the packet loss ratio is lower than the current packet loss ratio, and performing B).

2. The method of claim 1, wherein C) comprises:
C1). judging whether the transmitting power obtained in B) is not larger than RTP, performing C2) if the transmitting power is not larger than RTP; otherwise, performing C3);
C2). increasing the transmitting rate as long as the packet loss ratio does not exceed RP with RTP as the transmitting power, taking the highest transmitting rate obtained as the current transmitting rate; switching between different antenna configurations at intervals based on the current transmitting rate and the transmitting power, taking an antenna configuration among the antenna configurations which generates a smaller packet loss ratio than the current packet loss ratio as the current antenna configuration, performing C2);
C3). switching between antenna configurations at intervals with the transmitting power obtained in B) as the current transmitting power and with the current transmitting rate, obtaining an antenna configuration among the antenna configurations which generates a smaller packet loss ratio than the current packet loss ratio, and performing B).

3. The method of claim 1, wherein A) further comprises: controlling the intelligent antenna system to transmit data packets by taking a pre-defined maximum transmitting power as the transmitting power and taking RR as the transmitting rate and taking an antenna configuration which is obtained by switching antenna configurations and under which the packet loss ratio does not exceed RP as the current antenna configuration.

4. The method of claim 1, wherein A further comprises:

A1). controlling the intelligent antenna system to adopt one of a plurality of antenna configurations and transmitting data packets using RTP as the transmitting power and RR as the transmitting rate, and obtaining the current packet loss ratio;

A2). judging whether the current packet loss ratio is larger than RP, and performing A3) if the current packet loss ratio is larger than RP;

A3). reducing the transmitting power as long as the packet loss ratio falls below or equals the RP with the current antenna configuration and with RR as the current transmitting rate, and adopting a reduced transmitting power as the current transmitting power;

A4). switching between different antenna configurations at intervals based on the current transmitting rate and the current transmitting power, taking an antenna configuration among the antenna configurations under which the packet loss ratio is lower than the current packet loss ratio as the current antenna configuration.

5. The method of claim 4, wherein step A2 further comprises: performing D) when determining the current packet loss ratio is smaller than or equal to RP;

wherein D) comprises: increasing the transmitting rate as long as the packet loss ratio does not exceed RP with RTP as the transmitting power, taking the highest transmitting rate obtained as the current transmitting rate; switching between different antenna configurations at intervals based on the current transmitting rate and the transmitting power, taking an antenna configuration among the antenna configurations which generates a smaller packet loss ratio than the current packet loss ratio as the current antenna configuration, and returning to D).

6. An apparatus for controlling an intelligent antenna system, comprising an initial configuration determine unit, a power control unit, and a configuration switch unit; wherein the system is pre-configured with a Request Min Rate (RR), a Request Max PER (RP) and a request TX power (RTP);

the initial configuration determine unit is to determine a current antenna configuration and a current transmitting power of the intelligent antenna system, and to send an adjust notification to the power control unit;

the power control unit is to gradually reduce transmitting power as long as packet loss ratio does not exceed RP with the current antenna configuration and with RR as a current transmitting rate after receiving the adjust notification, to take a reduced transmitting power as the current transmitting power, and to send a switch notification to the configuration switch unit;

the configuration switch unit is to switch between different antenna configurations at intervals based on the current transmitting rate and the current transmitting power to obtain an antenna configuration which generates a smaller packet loss ratio than the current packet loss ratio after receiving the switch notification from the power control unit, and to send an adjust notification to the power control unit.

7. The apparatus of claim 6, wherein the power control unit comprises: a power adjust sub unit, a power judge sub unit and a rate adjust sub unit; wherein the power adjust sub unit is to obtain a minimal transmitting power as long as the packet loss ratio does not exceed RP with the current antenna configuration and with RR as the current transmitting rate after receiving the adjust notification;

the power judge sub unit is to judge whether the minimal transmitting power obtained by the power adjust sub unit is not larger than RTP, and to send an adjust notification to the rate adjust sub unit if the minimal transmitting power is RTP; otherwise, to adopt the minimal transmitting power as the current transmitting power, and to send a switch notification to the configuration switch unit;

the rate adjust sub unit is to increase the transmitting rate as long as the packet loss ratio does not exceed RP with RTP as the transmitting power, to adopt the highest transmitting rate obtained as the current transmitting rate, and to send a switch notification to the configuration switch unit;

the configuration switch unit is to send an adjust notification to the rate configuration sub unit after receiving the switch notification from the rate adjust sub unit and obtaining the antenna configuration which generates a smallest packet loss ratio among the antenna configurations; to send an adjust notification to the power adjust sub unit after receiving the switch notification from the power judge sub unit and obtaining the antenna configuration which generates the smallest packet loss ratio among the antenna configurations;

wherein the configuration switch unit comprises an antenna configuration determine unit and a decoding circuit;

the antenna configuration determine unit is to generate a data signal for indicating an antenna configuration to be switched to, and to provide the data signal for the decoding circuit; and the decoding circuit is to decode the data signal to obtain the antenna configuration, and to control a switch between a wireless signal transceiver and each intelligent antenna to connect each selected intelligent antenna with the wireless signal transceiver and to disconnect each un-selected intelligent antenna from the wireless signal transceiver according to the obtained antenna configuration.

8. The apparatus of claim 6, wherein the initial configuration determine unit is to control the intelligent antenna system to transmit data packets by taking a pre-defined maximum transmitting power as the transmitting power and taking RR as the transmitting rate and taking an antenna configuration which is obtained by switching antenna configurations and under which the packet loss ratio does not exceed RP as the current antenna configuration.

9. The apparatus of claim 6, wherein the initial configuration determine unit comprises: a packet loss ratio determine sub unit, a packet loss ratio judge sub unit, a power determine sub unit and a configuration switch sub unit; wherein the packet loss ratio determine sub unit is configured to control the intelligent antenna system to adopt one of antenna configurations and transmit data packets with RTP as the transmitting power and RR as the transmitting rate, and obtain a current packet loss ratio;

the packet loss ratio judge sub unit is to judge whether the current packet loss ratio exceeds RP;

the power determine sub unit is to adopt the current antenna configuration when the packet loss ratio judge sub unit determines the current packet loss ratio exceeds RP, to increase the transmitting power with RR as the current transmitting rate as long as the packet loss ratio does not exceed RP, and to take the highest transmitting power as the current transmitting power;

the configuration switch sub unit is to switch between different antenna configurations based on the current transmitting rate and the current transmitting power after the power determine sub unit has increased the transmitting power, to take an antenna configuration which generates a smaller packet loss ratio than the current packet loss ratio among the antenna configurations as the current antenna configuration, and to send an adjust notification to the power control unit.

10. The apparatus of claim 9, further comprising: a rate adjust unit; wherein
the rate adjust unit is to increase the transmitting rate with RTP as the transmitting power as long as the packet loss ratio RP when the packet loss ratio judge sub unit determines the current packet loss ratio RP or after receiving the adjust notification from the configuration switch unit, to take the highest transmitting rate obtained as the current transmitting rate, and to send a switch notification to the configuration switch unit;
the configuration switch unit is further to switch between different antenna configurations at intervals based on the current transmitting rate and the current transmitting power after receiving the switch notification from the rate adjust unit, to take an antenna configuration under which generates a smaller packet loss ratio than the current packet loss ratio among the antenna configurations as the current antenna configuration; and to send an adjust notification to the rate adjust unit.

11. An intelligent antenna system, comprising a wireless signal transceiver, an intelligent antenna array and a configuration module; wherein
each intelligent antenna in the intelligent antenna array is connectable with the wireless signal transceiver via a switch;
the configuration module is pre-configured with a Request Min Rate (RR), a Request Max PER (RP) and a request TX power (RTP), and comprises an initial configuration determine unit, a power control unit, and a configuration switch unit;
wherein the initial configuration determine unit is to determine a current antenna configuration and a current transmitting power of the intelligent antenna system, and to send an adjust notification to the power control unit;
the power control unit is to gradually reduce transmitting power as long as packet loss ratio does not exceed RP with the current antenna configuration and with RR as a current transmitting rate after receiving the adjust notification, to take a reduced transmitting power as the current transmitting power, and to send a switch notification to the configuration switch unit;
the configuration switch unit is to switch between different antenna configurations at intervals based on the current transmitting rate and the current transmitting power to obtain an antenna configuration which generates a smaller packet loss ratio than the current packet loss ratio after receiving the switch notification from the power control unit, and to send an adjust notification to the power control unit.

12. The system of claim 11, wherein the power control unit comprises: a power adjust sub unit, a power judge sub unit and a rate adjust sub unit; wherein
the power adjust sub unit is to obtain a minimal transmitting power as long as the packet loss ratio does not exceed RP with the current antenna configuration and with RR as the current transmitting rate after receiving the adjust notification;
the power judge sub unit is to judge whether the minimal transmitting power obtained by the power adjust sub unit is not larger than RIP, and to send an adjust notification to the rate adjust sub unit if the minimal transmitting power is RTP; otherwise, to adopt the minimal transmitting power as the current transmitting power, and to send a switch notification to the configuration switch unit;
the rate adjust sub unit is to increase the transmitting rate as long as the packet loss ratio does not exceed RP with RTP as the transmitting power, to adopt the highest transmitting rate obtained as the current transmitting rate, and to send a switch notification to the configuration switch unit;
the configuration switch unit is to send an adjust notification to the rate configuration sub unit after receiving the switch notification from the rate adjust sub unit and obtaining the antenna configuration which generates a smallest packet loss ratio among the antenna configurations; to send an adjust notification to the power adjust sub unit after receiving the switch notification from the power judge sub unit and obtaining the antenna configuration which generates the smallest packet loss ratio among the antenna configurations.

13. The system of claim 11, wherein the initial configuration determine unit is to control the intelligent antenna system to transmit data packets by taking a pre-defined maximum transmitting power as the transmitting power and taking RR as the transmitting rate and taking an antenna configuration which is obtained by switching antenna configurations and under which the packet loss ratio does not exceed RP as the current antenna configuration.

14. The system of claim 11, wherein the initial configuration determine unit comprises: a packet loss ratio determine sub unit, a packet loss ratio judge sub unit, a power determine sub unit and a configuration switch sub unit; wherein
the packet loss ratio determine sub unit is configured to control the intelligent antenna system to adopt one of antenna configurations and transmit data packets with RTP as the transmitting power and RR as the transmitting rate, and obtain a current packet loss ratio;
the packet loss ratio judge sub unit is to judge whether the current packet loss ratio exceeds RP;
the power determine sub unit is to adopt the current antenna configuration when the packet loss ratio judge sub unit determines the current packet loss ratio exceeds RP, to increase the transmitting power with RR as the current transmitting rate as long as the packet loss ratio does not exceed RP, and to take the highest transmitting power as the current transmitting power;
the configuration switch sub unit is to switch between different antenna configurations based on the current transmitting rate and the current transmitting power after the power determine sub unit has increased the transmitting power, to take an antenna configuration which generates a smaller packet loss ratio than the current packet loss ratio among the antenna configurations as the current antenna configuration, and to send an adjust notification to the power control unit.

15. The system of claim 14, further comprising: a rate adjust unit; wherein
the rate adjust unit is to increase the transmitting rate with RTP as the transmitting power as long as the packet loss ratio RP when the packet loss ratio judge sub unit determines the current packet loss ratio RP or after receiving the adjust notification from the configuration switch unit, to take the highest transmitting rate obtained as the current transmitting rate, and to send a switch notification to the configuration switch unit;
the configuration switch unit is further to switch between different antenna configurations at intervals based on the current transmitting rate and the current transmitting power after receiving the switch notification from the rate adjust unit, to take an antenna configuration under which generates a smaller packet loss ratio than the current packet loss ratio among the antenna configurations as the current antenna configuration; and to send an adjust notification to the rate adjust unit.

* * * * *

UNITED STATES PATENT AND TRADEMARK OFFICE
CERTIFICATE OF CORRECTION

PATENT NO.      : 8,817,650 B2
APPLICATION NO. : 13/812456
DATED           : August 26, 2014
INVENTOR(S)     : Qiang Guo Page 1 of 1

It is certified that error appears in the above-identified patent and that said Letters Patent is hereby corrected as shown below:

In the Specification

In column 1, line 4, above "BACKGROUND" insert
-- CLAIM FOR PRIORITY
The present application is a national stage filing under 35 U.S.C. 371 of PCT application number PCT/CN2011/077674, having an international filing date of July 27, 2011, which claims priority to Chinese Patent Application No. 201010239309.8, filed on July 27, 2010, the disclosures of which are hereby incorporated by reference in their entireties. --.

In the Claims

In column 10, line 24, in Claim 1, delete "(RIP);" and insert -- (RTP); --, therefor.

In column 13, line 66, in Claim 12, delete "RIP," and insert -- RTP, --, therefor.

Signed and Sealed this
Sixth Day of January, 2015

Michelle K. Lee
*Deputy Director of the United States Patent and Trademark Office*